United States Patent
Fujiki et al.

(10) Patent No.: US 9,166,253 B2
(45) Date of Patent: Oct. 20, 2015

(54) SOLID-STATE BATTERY

(71) Applicant: Samsung Electronics Co., Ltd., Suwon-si, Gyeonggi-do (KR)

(72) Inventors: Satoshi Fujiki, Kanagawa (JP); Yuichi Aihara, Kanagawa (JP); Koji Hoshiba, Kanagawa (JP)

(73) Assignee: SAMSUNG ELECTRONICS CO., LTD. (KR)

( * ) Notice: Subject to any disclaimer, the term of this patent is extended or adjusted under 35 U.S.C. 154(b) by 135 days.

(21) Appl. No.: 14/096,734

(22) Filed: Dec. 4, 2013

(65) Prior Publication Data

US 2014/0162138 A1    Jun. 12, 2014

(30) Foreign Application Priority Data

Dec. 6, 2012  (JP) ................................. 2012-267291
Aug. 14, 2013  (KR) ........................ 10-2013-0096872

(51) Int. Cl.
*H01M 10/0562*  (2010.01)
*H01M 10/0525*  (2010.01)

(52) U.S. Cl.
CPC ...... *H01M 10/0562* (2013.01); *H01M 10/0525* (2013.01); *Y02E 60/122* (2013.01)

(58) Field of Classification Search
None
See application file for complete search history.

(56) References Cited

U.S. PATENT DOCUMENTS

2011/0143213 A1*  6/2011  Ota et al. ...................... 429/322
2012/0189918 A1*  7/2012  Tatsumisago et al. ........ 429/322

FOREIGN PATENT DOCUMENTS

| JP | 2004-206942 A | 7/2004 |
| JP | 2008-103281 A | 5/2008 |
| JP | 2008-103282 A | 5/2008 |
| JP | 2011-187253 A | 9/2011 |
| JP | 2012-160379 A | 8/2012 |
| JP | 2012-209256 A | 10/2012 |
| JP | 2013-012416 A | 1/2013 |
| KR | 1020070069200 A | 7/2007 |

* cited by examiner

*Primary Examiner* — Patrick Ryan
*Assistant Examiner* — Christopher Domone
(74) *Attorney, Agent, or Firm* — Cantor Colburn LLP (57) ABSTRACT

A solid-state battery including: a cathode, an anode, a solid-state electrolyte layer disposed between the cathode and the anode, wherein the solid-state electrolyte layer and at least the cathode of the cathode and the anode includes a sulfide solid-state electrolyte, the sulfide solid-state electrolyte includes an amorphous material and a crystalline material, a first proportion of the amorphous material in at least the cathode of the cathode and the anode is greater than a first proportion of the crystalline material in at least the cathode of the cathode and the anode, and a second proportion of the amorphous material in the solid-state electrolyte layer is less than a second proportion of the crystalline material in the solid-state electrolyte layer.

16 Claims, 1 Drawing Sheet

SOLID-STATE BATTERY

RELATED APPLICATIONS

This application claims priority to and the benefit of Japanese Patent Application No. 2012-267291, filed on Dec. 6, 2012, and Korean Patent Application No. 10-2013-0096872, filed on Aug. 14, 2013, and all the benefits accruing therefrom under 35 U.S.C. §119, the contents of which are incorporated herein in their entirety by reference.

BACKGROUND

1. Field

The present disclosure relates to a solid-state battery.

2. Description of the Related Art

As a lithium-ion secondary battery, solid-state batteries using a solid-state electrolyte are known. The solid-state battery is composed of an electrolyte layer including a solid-state electrolyte, electrodes (cathode and anode) formed on opposite surfaces of the solid-state electrolyte layer, and current collectors that are respectively bonded to the electrodes.

In the solid-state battery, in general, the solid-state electrolyte is also mixed in each electrode. A sulfide-based solid-state electrolyte having excellent lithium-ion conductivity is used as a solid-state electrolyte.

A solid-state battery using amorphous/crystalline sulfide solid-state electrolytes in a solid-state electrolyte layer between a cathode and an anode is disclosed in Japanese Patent Application Laid-Open Publication No. 2008-103281, the content of which is incorporated herein by reference in its entirety. Also, a solid-state battery using amorphous/crystalline sulfide-based solid-state electrolytes in solid-state electrolytes of a cathode and/or an anode is disclosed in Japanese Patent Application Laid-Open Publication No. 2008-103282, the content of which is incorporated herein by reference in its entirety.

Nonetheless, there remains a need for an improved solid-state battery.

SUMMARY

Provided are solid-state batteries having improved discharge capacity and cycle characteristics.

Additional aspects will be set forth in part in the description which follows and, in part, will be apparent from the description, or may be learned by practice of the presented embodiments.

According to an aspect, a solid-state battery includes a cathode; an anode; a solid-state electrolyte layer disposed between the cathode and the anode, wherein the solid-state electrolyte layer and at least the cathode of the cathode and the anode include a sulfide solid-state electrolyte, the sulfide solid-state electrolyte includes an amorphous material and a crystalline material, a first proportion of the amorphous material in at least the cathode of the cathode and the anode is greater than a first proportion of the crystalline material in at least the cathode of the cathode and the anode, and a second proportion of the amorphous material in the solid-state electrolyte layer is less than a second proportion of the crystalline material in the solid-state electrolyte layer.

BRIEF DESCRIPTION OF THE DRAWING

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a solid-state battery will be described in more detail.

In general, a sulfide-based solid-state electrode includes an amorphous type solid-state electrolyte (an amorphous material), in which lithium sulfide ($Li_2S$) and phosphorus pentasulfide ($P_2S_5$) are processed by mechanical milling ("MM"), and a crystalline type solid-state electrolyte (a crystalline material) having a glass structure which is crystallized by sintering the amorphous type solid-state electrolyte at a high temperature. The amorphous type solid-state electrolyte is flexible and has a lithium-ion conductivity of about $10^{-4}$ Siemens per centimeter (S/cm). In contrast, the crystalline type solid-state electrolyte is hard and has a lithium-ion conductivity of about $10^{-3}$ S/cm, which is about 10 times greater than that of the amorphous type solid-state electrolyte.

The crystalline type solid-state electrolyte is capable of increasing discharge capacity of a battery due to high lithium-ion conductivity and may be used in order to improve output characteristics of the solid-state battery. However, since the charge and discharge of the solid-state battery may accompany the expansion/contraction of an electrode active material, pores may form at an interface between the electrode active material and the crystalline solid-state electrolyte by using the crystalline type solid-state electrolyte. As a result, the interface may develop a high resistance layer and thus, charge and discharge cycle characteristics of the solid-state battery may degrade.

As a result of a significant amount of research, it has been found that the occurrence of pores at the interface between the electrode active material and the solid-state electrolyte may be prevented by respectively controlling a proportion of an amorphous structure of the solid-state electrolyte in a cathode and an anode and a proportion of the amorphous structure of the solid-state electrolyte in a solid-state electrolyte layer while improving the ionic conductivity, and thus, the degradation of the cycle characteristics of the battery may be prevented or substantially avoided.

In the cathode and/or the anode, the formation of pores at the interface between the electrode active material and the solid-state electrolyte during charge and discharge may be prevented by using a flexible amorphous solid-state electrolyte together with the crystalline solid-state electrolyte.

Since the solid-state electrolyte layer receives only the stress accompanied by volume changes due to the cathode and the anode during a charge and discharge process, a volume change of the solid-state electrolyte itself almost does not occur. Therefore, a large amount of the crystalline solid-state electrolyte having higher ionic conductivity than the amorphous solid-state electrolyte may be used in the solid-state electrolyte layer. Since a large amount of the amorphous solid-state electrolyte is contained in the cathode and/or the anode and the large amount of the crystalline solid-state electrolyte is contained in the solid-state electrolyte layer, the formation of pores at the interface of the active material-solid-state electrolyte during the charge and discharge process may be prevented while maintaining high lithium-ion conductivity.

That is, the solid-state battery according to the embodiment includes a cathode; an anode; a solid-state electrolyte layer disposed between the cathode and the anode, wherein the solid-state electrolyte layer and at least the cathode of the cathode and the anode each include a sulfide-based solid-state electrolyte, the sulfide-based solid-state electrolyte includes an amorphous material and a crystalline material, a first proportion (A) of the amorphous material is greater than a first proportion (A') of the crystalline material of the sulfide-based solid-state electrolyte that is included in at least the cathode of the cathode and the anode, and a second proportion (B) of the amorphous material is less than a second proportion (B') of the crystalline material in the sulfide-based solid-state electrolyte that is included in the solid-state electrolyte layer.

The sulfide-based solid-state electrolyte must be included in the cathode and may be selectively included in the anode. When the sulfide-based solid-state electrolyte is included in the cathode, the first proportion (A') of the crystalline material in the cathode denotes a portion of the cathode occupied by the crystalline material in a total weight of the amorphous material and the crystalline material that are included in the cathode. When the sulfide-based solid-state electrolyte is included both in the cathode and the anode, the first proportion (A') of the crystalline material in the cathode denotes a portion of the cathode occupied by the crystalline material in a total weight of the amorphous material and the crystalline material that are included in at least the cathode of the cathode and the anode. Also, when the sulfide-based solid-state electrolyte is included in the cathode, the proportion (A) of the amorphous material in the cathode denotes a portion occupied by the amorphous material based on the total weight of the amorphous material and the crystalline material that are included in the cathode. When the sulfide-based solid-state electrolyte is included both in the cathode and the anode, the proportion (A) of the amorphous material in the cathode denotes a portion occupied by the amorphous material based on the total weight of the amorphous material and the crystalline material that are included in at least the cathode and the anode. The same also applies to the case of the solid-state electrolyte layer.

In the solid-state battery, the first proportion (A) of the amorphous material of the solid-state electrolyte that is included in at least the cathode of the cathode and the anode may be greater than the second proportion (B) of the amorphous material of the solid-state electrolyte that is included in the solid-state electrolyte layer.

For example, both the first proportion (A) of the amorphous material of the solid-state electrolyte of the cathode in a case where the anode does not include the solid-state electrolyte and the proportion (A) of the amorphous material of at least one of the solid-state electrolyte of the cathode and the solid-state electrolyte of the anode in a case where the anode includes the solid-state electrolyte may be greater than the second proportion (B) of the amorphous material of the solid-state electrolyte of the solid-state electrolyte layer.

For example, when a cathode, an anode, and a solid-state electrolyte layer including a solid-state electrolyte that is disposed between the cathode and the anode are included, the cathode of the cathode and the anode includes the solid-state electrolyte, and the solid-state electrolyte includes an amorphous material and a crystalline material, the first proportion (A) of the amorphous material of the solid-state electrolyte of the cathode in a case where the anode does not include the solid-state electrolyte, the first proportion (A) of the amorphous material of at least one of the solid-state electrolyte of the cathode and the solid-state electrolyte of the anode in a case where the anode includes the solid-state electrolyte, and the second proportion (B) of the amorphous material in the solid-state electrolyte of the solid-state electrolyte layer may have the relationship $0<B<A<1$.

For example, in the solid-state battery, the first proportion (A) of the amorphous material of the solid-state electrolyte that is included in at least the cathode of the cathode and the anode and the second proportion (B) of the amorphous material of the solid-state electrolyte that is included in the solid-state electrolyte layer may have the relationship $0.1 \leq B<A \leq 0.9$.

For example, in the solid-state battery, the first proportion (A) of the amorphous material of the solid-state electrolyte that is included in at least the cathode of the cathode and the anode and the second proportion (B) of the amorphous material of the solid-state electrolyte of the solid-state electrolyte layer may have the relationship $0.1 \leq B<0.5<A \leq 0.9$.

In an embodiment, the first proportion of the amorphous material is present in an amount of about 10 weight percent to about 90 weight percent, based on a total content of the sulfide solid-state electrolyte in at least the cathode of the cathode and the anode, and the second proportion of the amorphous material may be present in an amount of about 10 weight percent to about 90 weight percent, based on a total content of the sulfide solid-state electrolyte in the solid-state electrolyte layer.

In an embodiment, the first proportion of the amorphous material is present in an amount of about 50 weight percent to about 90 weight percent, based on a total content of the sulfide solid-state electrolyte in at least the cathode of the cathode and the anode. Also, in an embodiment, the first proportion of the amorphous material may be present in an amount of about 70 weight percent to about 90 weight percent, based on a total content of the sulfide solid-state electrolyte in at least the cathode of the cathode and the anode. In an embodiment, the second proportion of the amorphous material is present in an amount of about 10 weight percent to about 50 weight percent, based on a total content of the sulfide solid-state electrolyte in the solid-state electrolyte layer. Also, in an embodiment, the second proportion of the amorphous material is present in an amount of about 10 weight percent to about 30 weight percent, based on a total content of the sulfide solid-state electrolyte in the solid-state electrolyte layer.

When the second proportion (B) of the amorphous material in the solid-state electrolyte of the solid-state electrolyte layer is less than about 0.1, e.g., corresponding to 10 wt %, the flexibility of the solid-state electrolyte may not be sufficient. When the second proportion (B) of the amorphous material in the solid-state electrolyte of the solid-state electrolyte layer is greater than about 0.5, e.g., 50 wt %, the lithium-ion conductivity of the solid-state electrolyte may decrease due to the low proportion of the crystalline material, and thus, discharge capacity of the battery may decrease. When the first proportion (A) of the amorphous material in the solid-state electrolyte of the cathode and the solid-state electrolyte of the anode is about 0.5 or less, the proportion of the amorphous material may decrease and pores may be formed between the electrode active material and the solid-state electrolyte due to the expansion and contraction of the electrode active material during charge and discharge of the battery. When the first proportion (A) of the amorphous material in the solid-state electrolyte of the cathode and the anode is greater than about 0.9, the discharge capacity of the battery may be decreased due to a decrease in the proportion of the crystalline material.

For example, in the solid-state battery, the first proportion (A) of the amorphous material in the solid-state electrolyte that is included in the cathode alone or the cathode and the anode may satisfy $0.5<A<0.9$, e.g., be between 50 wt % and 90 wt %. For example, in the solid-state battery, the first proportion (A) of the amorphous material in the solid-state electrolyte that is included in the cathode alone or in the cathode and the anode may satisfy $0.7<A<0.9$. For example, in the solid-state battery, the proportion (A) of the amorphous material in the solid-state electrolyte that is included in the cathode alone or in the cathode and the anode may satisfy $0.75<A<0.85$, e.g., be between 75 wt % and 85 wt %.

For example, in the solid-state battery, the second proportion (B) of the amorphous material in the solid-state electrolyte that is included in the solid-state electrolyte layer may satisfy $0.1<B<0.5$. For example, in the solid-state battery, the second proportion (B) of the amorphous material in the solid-state electrolyte that is included in the solid-state electrolyte layer may satisfy $0.1<B<0.3$. For example, in the solid-state battery, the second proportion (B) of the amorphous material in the solid-state electrolyte that is included in the solid-state electrolyte layer may satisfy $0.15<B<0.25$.

In the solid-state battery, the solid-state electrolyte may comprise a sulfide-based solid-state electrolyte. For example, the sulfide-based solid-state electrolyte may comprise a mixture of lithium sulfide and phosphorus pentasulfide.

For example, in the solid-state battery, a first proportion (A1) of lithium sulfide of the solid-state electrolyte included in the cathode may be greater than a second proportion (B1) of lithium sulfide of the solid-state electrolyte included in each of the anode and the solid-state electrolyte layer. The first proportion (A1) of lithium sulfide in the cathode denotes a portion of the cathode occupied by lithium sulfide with respect to a total amount of moles of lithium sulfide and phosphorus pentasulfide. The same also applies to each case of the anode and the solid-state electrolyte layer.

For example, in the solid-state battery, the first proportion (A1) of lithium sulfide of the solid-state electrolyte included in the cathode and the second proportion (B1) of lithium sulfide in the solid-state electrolyte included in each of the anode and the solid-state electrolyte layer may satisfy the following relationship $0.6 \leq B1<A1 \leq 0.85$.

For example, in the solid-state battery, the first proportion (A1) of lithium sulfide of the solid-state electrolyte included in the cathode may satisfy $0.70 \leq A1 \leq 0.85$. For example, in the solid-state battery, the first proportion (A1) of lithium sulfide of the solid-state electrolyte included in the cathode may satisfy $0.75 \leq A1 \leq 0.85$. For example, in the solid-state electrolyte included in the cathode, lithium sulfide and phosphorus pentasulfide may be mixed at a molar proportion of about 8.5:1.5 to about 7:3.

For example, in the solid-state battery, the second proportion (B1) of lithium sulfide included in each of the anode and the solid-state electrolyte layer may satisfy $0.60 \leq B < 0.75$. For example, in the solid-state battery, the second proportion (B1) of lithium sulfide included in each of the anode and the solid-state electrolyte layer may satisfy $0.65 \leq B < 0.75$. For example, in the solid-state electrolyte included in each of the anode and the solid-state electrolyte layer, lithium sulfide and phosphorus pentasulfide may be mixed at a molar proportion of about 6:4 to about 7.5:2.5.

In an embodiment, the first proportion of the lithium sulfide is greater than the second proportion of the lithium sulfide. Also, in an embodiment, the first proportion of the lithium sulfide and the second proportion the lithium sulfide are each independently present in an amount of about 60 weight percent to about 85 weight percent, based on a total weight of the lithium sulfide and phosphorus pentasulfide.

Hereinafter, the solid-state battery will be described in more detail with reference to the accompanying drawings.

1. Configuration of Solid-State Battery

Figure 1:
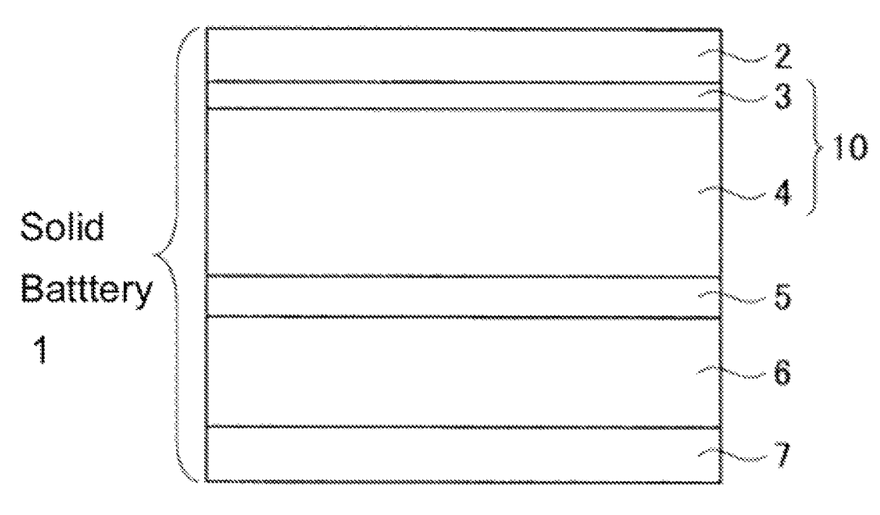
FIG. 1 is a cross-sectional view illustrating a structure of an embodiment of a solid-state battery.

First, a configuration of a solid-state battery 1 according to an embodiment is described with reference to FIG. 1. The solid-state battery 1 includes a cathode current collector 2, an adhesive layer 3, a cathode layer 4, a solid-state electrolyte layer 5, an anode layer 6, and an anode current collector 7. A cathode 10 of the solid-state battery 1 is composed of the adhesive layer 3 and the cathode layer 4. An anode of the solid-state battery 1 comprises, and may consist of, the anode layer 6. Also, the solid-state battery 1 may not include the adhesive layer 3.

The cathode current collector 2 may comprise any suitable conductor, and for example, may comprise aluminum, stainless steel, nickel plated steel, or a combination thereof.

The adhesive layer 3 is introduced for binding the cathode current collector 2 and the cathode layer 4. The adhesive layer 3 may include an adhesive layer conductive material, a first binder, and a second binder. Examples of the adhesive layer conductive material may be carbon black such as Ketjen black and acetylene black, graphite, natural graphite, and artificial graphite. However, the adhesive layer conductive material is not particularly limited so long as it increases the conductivity of the adhesive layer 3, and the adhesive layer conductive material may be used alone or by mixing a plurality of adhesive layer conductive materials.

The first binder, for example, may be a non-polar resin that does not have a polar functional group. Therefore, the first binder is inactive to a highly reactive solid-state electrolyte, particularly, a sulfide-based solid-state electrolyte. It is known that the sulfide-based solid-state electrolyte is active to a functional group having a polar structure, such as acids, alcohols, amines, and ethers. The first binder is used for binding of the cathode layer 4, and when the first binder or the same component as the first binder is included in the cathode layer 4, the first binder in the adhesive layer 3 may be strongly bonded to the cathode layer 4 by interdiffusion with the first binder in the cathode layer 4 through an interface between the adhesive layer 3 and the cathode layer 4. Therefore, the first binder may be included in the cathode layer 4.

Examples of the first binder may be a styrene-based thermoplastic elastomer such as a styrene-butadiene block copolymer ("SBS"), a styrene-ethylene-butadiene-styrene block copolymer ("SEBS"), and a styrene-styrene butadiene-styrene block copolymer, a styrene-butadiene rubber ("SBR"), a butadiene rubber ("BR"), a natural rubber ("NR"), an isoprene rubber ("IR"), an ethylene-propylene-diene terpolymer (EPDM), and partially or fully hydrogenated products thereof. In addition, examples of the first binder may be polystyrene, polyolefin, an olefin-based thermoplastic elastomer, polycycloolefin, and a silicon resin. However, the first binder is not necessarily limited thereto, and any non-polar resin that can be used as a binder in the art may be used.

The second binder is a binder that has better binding ability with respect to the cathode current collector 2 than the first binder. The excellent binding ability of the second binder with respect to the cathode current collector 2, for example, may be determined by measuring a force required to delaminate a binder film, which may be obtained by coating the cathode current collector 2 with a binder solution and drying, from the cathode current collector 2 with a commercial peel tester. The second binder, for example, may be a polar functional group containing resin having a polar functional group, and may be strongly bonded to the cathode current collector 2 via hydrogen bonds. However, since the second binder may have high reactivity to the sulfide-based solid-state electrolyte in many cases, the second binder is not included in the cathode layer 4.

Examples of the second binder may be a nitrile rubber ("NBR"), a chloroprene rubber ("CR"), and partially or fully hydrogenated products thereof; a polyacrylic acid ester copolymer, polyvinylidene fluoride ("PVDF"), a vinylidene fluoride-hexafluoropropylene copolymer ("VDF-HFP"), and carboxylic acid modified products thereof; chlorinated polyethylene ("CM"); a polymethacrylic acid ester; polyvinyl alcohol; an ethylene-vinyl alcohol copolymer; polyimide; polyamide; and polyamideimide. Also, examples of the second binder may be polymers copolymerized with monomers having carboxylic acid, sulfonic acid, and phosphoric acid. However, the second binder is not necessarily limited thereto, and any polar resin that can be used as a binder in the art may be used.

Also, a ratio of contents of the adhesive layer conductive material, the first binder, and the second binder in the adhesive layer is not particularly limited. For example, the content of the adhesive layer conductive material is in a range of about 50 wt % to about 96 wt % based on a total weight of the adhesive layer 3, the content of the first binder is in a range of about 3 wt % to about 30 wt % based on the total weight of the adhesive layer 3, and the content of the second binder is in a range of about 2 wt % to about 20 wt % based on the total weight of the adhesive layer 3.

The cathode layer 4 may include a sulfide-based solid-state electrolyte, a cathode active material, and a cathode layer conductive material. The cathode layer conductive material may be the same material as the adhesive layer conductive material.

The sulfide-based solid-state electrolyte may include at least lithium sulfide as a first component and may include one or more compounds selected from the group consisting of silicon sulfide, phosphorus sulfide, and boron sulfide, as a second component. In particular, the sulfide-based solid-state electrolyte may be $Li_2S$—$P_2S_5$. The sulfide-based solid-state electrolyte may include sulfides, such as $SiS_2$, $GeS_2$, and $B_2S_3$, in addition to $Li_2S$—$P_2S_5$ that is known to have higher lithium-ion conductivity than other inorganic compounds. Also, an inorganic solid-state electrolyte, in which an appropriate amount of $Li_3PO_4$, halogen, or a halogen compound is added to an inorganic solid-state electrolyte that is formed by the combination of $Li_2S$—$P_2S_5$, $SiS_2$, $GeS_2$, and $B_2S_3$, may be used as the sulfide-based solid-state electrolyte.

The sulfide-based solid-state electrolyte may be prepared from lithium sulfide and phosphorus pentasulfide ($P_2S_5$); or lithium sulfide, elemental phosphorus, and elemental sulfur; or lithium sulfide, $P_2S_5$, elemental phosphorus and/or elemental sulfur.

Lithium sulfide that is industrially available may be used for preparing the sulfide-based solid-state electrolyte. However, the lithium sulfide may be of high purity.

In the lithium sulfide, a total content of sulfur oxide in a lithium salt may be about 0.15 wt % or less and for example, may be about 0.1 wt % or less and an amount of lithium N-methylaminobutyrate may be about 0.15 wt % or less and for example, may be about 0.1 wt % or less.

In a case where the total content of sulfur oxide in the lithium salt (i.e., lithium sulfide) is about 0.15 wt % or less, the solid-state electrolyte, which may be obtained by melt quenching or mechanical milling, may be a glassy solid-state electrolyte (completely amorphous material). That is, when the total content of sulfur oxide in the lithium salt is greater than about 0.15 wt %, a crystallized product having low ionic conductivity may be obtained. Also, since the crystallized product is not changed by a heat treatment, production of a solid-state electrolyte having high ionic conductivity may be avoided.

Further, in a case where the content of lithium N-methylaminobutyrate is 0.15 wt % or less, a degraded product of lithium N-methylaminobutyrate does not deteriorate cycle performance of the lithium battery.

Therefore, a solid-state electrolyte having high ionic conductivity may be obtained by using the lithium sulfide having reduced impurities.

A method of preparing lithium sulfide ($Li_2S$) that is used in the preparation of a highly ionic conductive solid-state electrolyte is not particularly limited so long as the method may reduce the impurities. For example, a method of forming lithium hydrogen sulfide (LiSH) by reacting lithium hydroxide and hydrogen sulfide at a temperature ranging from about 0° C. to about 150° C. in an aprotic organic solvent and subsequently removing hydrogen sulfide ($H_2S$) from the reaction solution at a temperature ranging from about 150° C. to about 200° C., a method of directly forming lithium sulfide by reacting lithium hydroxide and hydrogen sulfide at a temperature ranging from about 150° C. to about 200° C. in an aprotic organic solvent, or a method of reacting lithium hydroxide and a gaseous sulfur source at a temperature ranging from about 130° C. to about 445° C. may be used.

A method of purifying lithium sulfide is not particularly limited. For example, lithium sulfide is cleaned at a temperature of about 100° C. or more by using an organic solvent. The organic solvent used in the cleaning may be a polar aprotic solvent, and the aprotic organic solvent used in the preparation of lithium sulfide and the polar aprotic organic solvent used in the cleaning may also be the same. Examples of the polar aprotic organic solvent used in the cleaning may be polar aprotic organic compounds, such as an amide compound, a lactam compound, a urea compound, an organic sulfur compound, and a cyclic organic phosphorus compound, and a single solvent or a mixed solvent thereof may be appropriately used as the polar aprotic organic solvent. For example, N-methyl-2-pyrrolidone ("NMP") may be selected.

An amount of the organic solvent used in the cleaning is not particularly limited. Also, the number of the cleaning is not particularly limited, but the cleaning may be performed twice or more. The cleaning may be performed under an atmosphere of an inert gas, such as nitrogen and argon.

Lithium sulfide may be prepared by drying the cleaned lithium sulfide above a temperature of a boiling point of the organic solvent used in the cleaning in an inert gas (e.g., nitrogen) atmosphere under atmospheric pressure or reduced pressure for about 5 minutes or more, for example, about 2 hours to about 3 hours or more.

$P_2S_5$ may be used without particular limitation as long as it is industrially manufactured and sold. However, instead of using $P_2S_5$, elemental phosphorus (P) and elemental sulfur (S) having a corresponding molar ratio may be used. The elemental P and elemental S may be used without particular limitation as long as it is industrially manufactured and sold.

A mixed molar ratio of lithium sulfide to phosphorus pentasulfide and/or elemental phosphorus and elemental sulfur may be in a range of about 50:50 to about 80:20, for example, about 60:40 to about 80:20. For example, the mixed molar ratio of $Li_2S:P_2S_5$ may be in a range of about 70:30 to about 80:20.

Also, the sulfide-based solid-state electrolyte may be obtained by a method in which $Li_2S$ and $P_2S_5$ are melt-mixed at a predetermined ratio by heating $Li_2S$ and $P_2S_5$ above melting temperatures thereof and the melt is quenched after holding it for a predetermined time (melt quenching method). Also, the sulfide-based solid-state electrolyte may be obtained by processing $Li_2S$—$P_2S_5$ by a mechanical milling method.

The ratio (A1) of lithium sulfide in the solid-state electrolyte in the cathode and the ratio (B1) of lithium sulfide in the solid-state electrolyte of each of the solid-state electrolyte layer and the anode may be set to satisfy $0.6 \leq B1 < A1 \leq 0.85$.

The mixed molar ratio of $Li_2S$—$P_2S_5$ may satisfy $70/30 \leq$ (lithium sulfide/phosphorus pentasulfide)$\leq 85/15$ in the cathode, and may satisfy $60/40 \leq$ (lithium sulfide/phosphorus pentasulfide)$\leq 75/25$ in each of the solid-state electrolyte layer and the anode. A molar ratio (C) of lithium sulfide to phosphorus pentasulfide in the cathode and a molar ratio (D) of lithium sulfide to phosphorus pentasulfide in each of the solid-state electrolyte layer and the anode may be set to satisfy $60/40 \leq D < C \leq 85/15$.

A lithium ion conductor composed of inorganic compounds may be further included as the solid-state electrolyte in addition to the sulfide-based solid-state electrolyte. Examples of the lithium ion conductor may be $Li_3N$, LISICON, $Li_{3+y}PO_{4-x}N_x$ (LIPON), $Li_{3.25}Ge_{0.25}P_{0.75}S_4$ (Thio-LISICON), and $Li_2O$—$Al_2O_3$—$TiO_2$—$P_2O_5$ (LATP).

The solid-state electrolyte may be in an amorphous phase, a glass phase, or have a crystal (glass-ceramic) structure. In a case where the solid-state electrolyte is a sulfide-based solid-state electrolyte formed of $Li_2S$—$P_2S_5$, the lithium-ion conductivity of an amorphous material is about $10^{-4}$ S/cm. In contrast, the lithium-ion conductivity of a crystalline material is about $10^{-3}$ S/cm.

In each of the cathode, the anode, and the electrolyte layer, the sulfide-based solid-state electrolyte may be formed of a mixture of an amorphous material and a crystalline material. The amorphous material may be prepared by mixing a first component and a second component of the above-described sulfide and processing the first component and the second component by a mechanical milling method. The crystalline material may be prepared by sintering the amorphous material.

Specifically, a method of preparing an amorphous sulfide-based solid-state electrolyte, for example, may include a melt quenching method or a mechanical milling (MM) method.

In the melt quenching method, predetermined amounts of $P_2S_5$ and $Li_2S$ are mixed in a mortar, and pellets thus prepared from the mixture are then put in a carbon-coated quartz tube and vacuum sealed. Thereafter, the pellets are reacted at a constant temperature and a sulfide-based amorphous material is then obtained by quenching the pellets by putting the quartz tube into ice water.

A reaction temperature during the reaction may be in a range of about 400° C. to about 1,000° C., for example, about 800° C. to about 900° C. A reaction time may be in a range of about 0.1 hours to about 12 hours, for example, about 1 hour to about 12 hours. A quenching temperature of the reaction product may be about 10° C. or less, for example, about 0° C. or less, and a cooling rate thereof may be in a range of about 1 K/sec to about 10,000 K/sec, for example, about 1 K/sec to about 1,000 K/sec.

In a case where the mechanical milling method is used, a sulfide-based amorphous material may be obtained by mixing predetermined amounts of $P_2S_5$ and $Li_2S$ in a mortar and reacting the mixture for a predetermined period of time by using the mechanical milling method.

In the mechanical milling method using the above raw materials, the reaction may be performed at room temperature. Since an amorphous solid-state electrolyte may be prepared at room temperature by the mechanical milling method, the decomposition of the raw materials may not occur, and thus, the amorphous solid-state electrolyte having a charged composition may be obtained. Also, in the mechanical milling method, fine powder of the amorphous solid-state electrolyte may be obtained simultaneously with the preparation of the amorphous solid-state electrolyte.

Various milling devices may be used for the mechanical milling method, and a planetary ball mill may be used.

Since pots used in the planetary ball mill rotate while a table revolves, the planetary ball mill may efficiently generate relatively high impact energy.

Rotation speed and time of the mechanical milling method are not particularly limited. However, since the rotation speed is high, a formation rate of the amorphous solid-state electrolyte may increase, and a conversion rate of the raw materials into the amorphous solid-state electrolyte may increase as the rotation time increases.

For example, when the planetary ball mill is used, the rotation speed used may be in a range of about a few tens to a few hundreds of rpms for about 0.1 hours to about 100 hours.

A crystalline sulfide-based solid-state electrolyte may be obtained by heating the amorphous sulfide-based solid-state electrolyte, which may be prepared by the above-described method, at a high temperature. The heat treatment temperature, for example, may be in a range of about 190° C. to about 340° C., about 195° C. to about 335° C., and about 200° C. to about 330° C. When the heat treatment temperature is lower than about 190° C., a crystalline material having high ionic conductivity may be difficult to obtain, and when the heat treatment temperature is greater than about 340° C., a crystalline material having low ionic conductivity may be generated.

For example, in a case where the heat treatment temperature is in a range of about 190° C. to about 340° C., a heat treatment time may be in a range of about 0.1 hours to about 240 hours, particularly, about 0.2 hours to about 230 hours. For example, when the heat treatment time is less than about 0.1 hours, a crystalline material having high ionic conductivity may be difficult to obtain, and when the heat treatment time is greater than about 240 hours, a crystalline material having low ionic conductivity may be generated.

In the cathode and/or the anode, the formation of pores at an interface between the electrode active material and the solid-state electrolyte during charge and discharge may be prevented by mixing the crystalline solid-state electrolyte with a flexible amorphous solid-state electrolyte.

Since the solid-state electrolyte layer receives only the stress accompanied by volume changes from the cathode and the anode during a charge and discharge process, a volume change of the solid-state electrolyte itself almost does not occur. Therefore, a large amount of the crystalline solid-state electrolyte that has higher ionic conductivity than the amorphous solid-state electrolyte may be used in the solid-state electrolyte layer.

Since a large amount of the amorphous solid-state electrolyte is contained in the cathode and/or the anode and the large amount of the crystalline solid-state electrolyte is contained in the solid-state electrolyte layer, the formation of pores at the interface between the active material and the solid-state electrolyte during the charge and discharge process may be prevented while maintaining high lithium-ion conductivity.

The first proportion (A) of the amorphous solid-state electrolyte in the cathode and the anode and the second proportion (B) of the amorphous solid-state electrolyte in the solid-state electrolyte layer may have a relationship of $0.1<B<0.5<A<0.9$.

When the second proportion (B) of the amorphous material in the solid-state electrolyte of the solid-state electrolyte layer is less than about 0.1, the flexibility of the solid-state electrolyte may not be sufficient. When the second proportion (B) of the amorphous material in the solid-state electrolyte of the solid-state electrolyte layer is greater than about 0.5, the lithium-ion conductivity may be decreased due to the low proportion of the crystalline material, and thus, discharge capacity of the battery may be decreased.

When the first proportion (A) of the amorphous material in the solid-state electrolyte of the cathode and the anode is about 0.5 or less, the proportion of the amorphous material may be decreased and pores may be formed between the electrode active material and the solid-state electrode due to the expansion and contraction of the electrode active material during the charge and discharge of the battery. When the first proportion (A) of the amorphous material in the solid-state electrolyte of the cathode and the anode is greater than about 0.9, the discharge capacity of the battery may be decreased due to a decrease in the proportion of the crystalline material.

A cathode active material is not particularly limited so long as it is a material that may reversibly store and release lithium ions. Examples of the cathode active material may be lithium cobalt oxide ("LCO"), lithium nickel oxide, lithium nickel cobalt oxide, lithium nickel cobalt aluminum oxide (hereinafter, it may also be referred to as "NCA"), lithium nickel cobalt manganese oxide (hereinafter, it may also be referred to as "NCM"), lithium manganate, lithium iron phosphate, nickel sulfide, copper sulfide, sulfur, iron oxide, and vanadium oxide. The cathode active material may be used alone or by mixing two or more thereof.

For example, the cathode active materials are lithium-containing metal oxides, and any cathode active material generally used in the art may be used without limitation. For example, one or more composite oxides of metals selected from cobalt, manganese, nickel, and combinations thereof and lithium may be used, and as particular examples thereof, a compound expressed as one of the following chemical formulas may be used: $Li_aA_{1-b}M_bD_2$ (where $0.90 \leq a \leq 1$, $0 \leq b \leq 0.5$); $Li_aE_{1-b}M_bO_{2-c}D_c$ (where $0.90 \leq a \leq 1$, $0 \leq b \leq 0.5$, $0 \leq c \leq 0.05$); $LiE_{2-b}M_bO_{4-c}D_c$ (where $0 \leq b \leq 0.5$, $0 \leq c \leq 0.05$); $Li_aNi_{1-b-c}Co_bM_cD_\alpha$ (where $0.90 \leq a \leq 1$, $0 \leq b \leq 0.5$, $0 \leq c \leq 0.05$, $0<\alpha \leq 2$); $Li_aNi_{1-b-c}Co_bM_cO_{2-\alpha}X_\alpha$ (where $0.90 \leq a \leq 1$, $0 \leq b \leq 0.5$, $0 \leq c \leq 0.05$, $0<\alpha<2$); $Li_aNi_{1-b-c}Co_bM_cO_{2-\alpha}X_2$ (where $0.90 \leq a \leq 1$, $0 \leq b \leq 0.5$, $0 \leq c \leq 0.05$, $0<\alpha<2$); $Li_aNi_{1-b-c}Mn_bM_cD_\alpha$ (where $0.90 \leq a \leq 1$, $0 \leq b \leq 0.5$, $0 \leq c \leq 0.05$, $0<\alpha \leq 2$); $Li_aNi_{1-b-c}Mn_bM_cO_{2-\alpha}X_\alpha$ (where $0.90 \leq a \leq 1$, $0 \leq b \leq 0.5$, $0 \leq c \leq 0.05$, $0<\alpha<2$); $Li_aNi_{1-b-c}Mn_bM_cO_{2-\alpha}X_2$ (where $0.90 \leq a \leq 1$, $0 \leq b \leq 0.5$, $0 \leq c \leq 0.05$, $0<\alpha<2$); $Li_aNi_bE_cG_dO_2$ (where $0.90 \leq a \leq 1$, $0 \leq b \leq 0.9$, $0 \leq c \leq 0.5$, $0.001 \leq d \leq 0.1$); $Li_aNi_b$-

$Co_cMn_dGeO_2$ (where $0.90 \le a \le 1$, $0 \le b \le 0.9$, $0 \le c \le 0.5$, $0 \le d \le 0.5$, $0.001 \le e \le 0.1$); $Li_aNiG_bO_2$ (where $0.90 \le a \le 1$, $0.001 \le b \le 0.1$); $Li_aCoG_bO_2$ (where $0.90 \le a \le 1$, $0.001 \le b \le 0.1$); $Li_aMnG_bO_2$ (where $0.90 \le a \le 1$, $0.001 \le b \le 0.1$); $Li_aMnG_bO_4$ (where $0.90 \le a \le 1$, $0.001 \le b \le 0.1$); $QO_2$; $QS_2$; $LiQS_2$; $V_2O_5$; $LiV_2O_5$; $LiX'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulas, A is nickel (Ni), cobalt (Co), manganese (Mn), or a combination thereof; M is aluminium (Al), Ni, Co, Mn, chromium (Cr), iron (Fe), magnesium (Mg), strontium (Sr), vanadium (V), rare earth elements, or a combination thereof; D is oxygen (O), fluorine (F), S, P, or a combination thereof; E is Co, Mn, or a combination thereof; X is F, S, P, or a combination thereof; G is Al, Cr, Mn, Fe, Mg, lanthanum (La), cerium (Ce), Sr, V, or a combination thereof; Q is titanium (Ti), molybdenum (Mo), Mn, or a combination thereof; X' is Cr, V, Fe, scandium (Sc), yttrium (Y), or a combination thereof; J is V, Cr, Mn, Co, Ni, copper (Cu), or a combination thereof.

Examples of the cathode active material may be $LiCoO_2$, $LiMn_xO_{2x}$ (x=1, 2), $LiNi_{1-x}Mn_xO_2$ ($0<x<1$), $LiNi_{1-x-y}Co_xMn_yO_2$ ($0 \le x \le 0.5$, $0 \le y \le 0.5$), $FePO_4$.

A compound having a coating layer on the above-described compounds may be used, or a compound may be used by mixing the above-described compounds and the compound having a coating layer. The coating layer may include a compound of a coating element such as an oxide, hydroxide, oxyhydroxide, oxycarbonate, or hydroxycarbonate of a coating element. The compound constituting the coating layer may be amorphous or crystalline. Examples of the coating element included in the coating layer may be Mg, Al, Co, potassium (K), sodium (Na), calcium (Ca), silicon (Si), Ti, V, tin (Sn), germanium (Ge), gallium (Ga), boron (B), arsenic (As), zirconium (Zr), and mixtures thereof. Any coating method may be used for a process of forming a coating layer as long as coating may be performed by a method (e.g., spray coating, dipping.) that does not adversely affect the physical properties of the cathode active material due to using such coating elements on the above-described compounds. Detailed description related to the coating method is not provided because it is obvious to those skilled in the art.

In particular, the cathode active material may be a lithium salt of transition metal oxide having a layered rock-salt type structure among the above exemplary cathode active materials. In the present specification, the expression "layered" denotes a shape of a thin sheet, and the expression "rock-salt type structure" denotes a sodium chloride-type structure as one of crystal structures in which face-centered cubic lattices respectively formed of anions and cations are shifted by only a half of the side of each unit lattice. Examples of the lithium salt of transition metal oxide having a layered rock-salt type structure may be lithium salts of ternary transition metal oxides expressed as $Li_{1-y-z}Ni_xCo_yAl_zO_2$ (NCA) or $Li_{1-y-z}Ni_x Co_yMn_zO_2$ (NCM) (where $0<x<1$, $0<y<1$, $0<z<1$, $x+y+z=1$).

A cathode layer binder, for example, may be a non-polar resin that does not have a polar functional group. Therefore, the cathode layer binder may be inactive to a highly reactive solid-state electrolyte, particularly, a sulfide-based solid-state electrolyte. The cathode layer binder, for example, may include the above-described first binder. Since the electrolyte of the solid-state battery 1 is a highly reactive sulfide-based solid-state electrolyte, the cathode layer binder may be a non-polar resin.

It is possible that the cathode layer 4 may not be sufficiently bonded to the cathode current collector 2, even in a case where the cathode layer 4 is directly bonded to the cathode current collector 2. Therefore, the adhesive layer 3 including the first binder and the second binder may be disposed between the cathode layer 4 and the cathode current collector 2. Accordingly, since the first binder in the adhesive layer 3 is strongly bonded to the cathode layer 4 and the second binder in the adhesive layer 3 is strongly bonded to the cathode current collector 2, the cathode current collector 2 and the cathode layer 4 may be strongly bonded together. Herein, in a case where the first binder is included as the cathode layer binder, the cathode layer 4 and the cathode current collector 2 may be strongly bonded together by the interdiffusion between the first binder in the adhesive layer 3 and the first binder in the cathode layer 4 through the interface between the adhesive layer 3 and the cathode layer 4.

Contents of the sulfide-based solid-state electrolyte in the cathode, the cathode active material, the cathode layer conductive material, and the cathode layer binder are not particularly limited. For example, the content of the sulfide-based solid-state electrolyte may be in a range of about 20 wt % to about 50 wt % based on a total weight of the cathode layer 4, the content of the cathode active material may be in a range of about 45 wt % to about 75 wt % based on the total weight of the cathode layer 4, the content of the cathode layer conductive material may be in a range of about 1 wt % to about 10 wt % based on the total weight of the cathode layer 4, and the content of the cathode layer binder may be in a range of about 0.5 wt % to about 4 wt % based on the total weight of the cathode layer 4.

The electrolyte layer 5 may include a sulfide-based solid-state electrolyte and an electrolyte binder. The electrolyte binder is a non-polar resin that does not have a polar functional group. Therefore, the electrolyte binder may be inactive to a highly reactive solid-state electrolyte, particularly, a sulfide-based solid-state electrolyte. The electrolyte binder, for example, may include the first binder.

The cathode layer 4 and the electrolyte layer 5 may be strongly bonded together by the interdiffusion between the first binder in the electrolyte layer 5 and the first binder in the cathode layer 4 through the interface between the cathode layer 4 and the electrolyte layer 5. Also, contents of the sulfide-based solid-state electrolyte and the electrolyte binder are not particularly limited. For example, the content of the sulfide-based solid-state electrolyte may be in a range of about 95 wt % to about 99.9 wt % based on a total weight of the electrolyte layer 5, and the content of the electrolyte binder may be in a range of about 0.5 wt % to about 5 wt % based on the total weight of the electrolyte layer 5.

The anode layer 6 may include an anode active material, an anode binder, and a solid-state electrolyte. The anode binder may include the above-described first binder. The anode layer 6 and the electrolyte layer 5 may be strongly bonded together by the interdiffusion between the first binder in the anode layer 6 and the first binder in the electrolyte layer 5.

Also, with respect to the anode active material, any anode active material used in a lithium battery in the art may be used. For example, the anode active material may include one or more selected from the group consisting of lithium metal, a metal alloyable with lithium, transition metal oxide, non-transition metal oxide, and a carbon-based material.

Examples of the metal alloyable with lithium may be Si, Sn, Al, Ge, lead (Pb), bismuth (Bi), antimony (Sb), an Si-M" alloy (where M" is alkaline metal, alkaline earth metal, a group 13 element, a group 14 element, transition metal, a rare earth element, or a combined element thereof, and is not Si), an Sn-M" alloy (where M" is alkali metal, alkaline earth metal, a Group 13 element, a Group 14 element, transition metal, a rare earth element, or a combined element thereof, and is not Sn). Examples of the element Y may be Mg, Ca, Sr, barium (Ba), radium (Ra), Sc, Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), zinc (Zn), cadmium (Cd), B, Al, Ga, Sn, indium (In), Ge, P, As, Sb, Bi, S, selenium (Se), tellurium (Te), polonium (Po), and combinations thereof.

For example, the transition metal may be lithium titanate, vanadium oxide, lithium vanadium oxide.

For example, the non-transition metal may be $SnO_2$, $SiO_x$ ($0<x<2$).

The carbon-based material may be crystalline carbon, amorphous carbon, or a mixture thereof. The crystalline carbon may be graphite such as shapeless, plate, flake, spherical, or fibrous natural graphite or artificial graphite, and the amorphous carbon may be soft carbon (low-temperature fired carbon) or hard carbon, mesophase pitch carbide, fired coke.

In particular, examples of the anode active material may be graphite-based active materials such as artificial graphite, natural graphite, a mixture of artificial graphite and natural graphite, and natural graphite coated with artificial graphite. Also, Sn and Si materials may be used as the anode active material instead of graphite.

Also, contents of the anode active material, the solid-state electrolyte, the first binder, and the second binder are not particularly limited. For example, the content of the sulfide-based solid-state electrolyte may be in a range of about 0 wt % to about 40 wt % based on a total weight of the anode layer 6, the content of the anode active material may be in a range of about 60 wt % to about 100 wt % based on the total weight of the anode layer 6, and the content of the first binder may be in a range of about 0.5 wt % to about 50 wt % based on the total weight of the anode layer 6. Any conductor may be used as the anode current collector 7. For example, the anode current collector 7 may be formed of copper, stainless steel, and nickel-plated steel. In addition, a known additive may be appropriately added to each layer.

In the solid-state battery, the solid-state electrolyte layer may have higher lithium-ion conductivity than the cathode and the anode. Since the solid-state electrolyte layer may have higher lithium-ion conductivity than the cathode and the anode, characteristics of the battery may be improved.

2. Preparation Method of Solid-State Battery

Next, a preparation method of the solid-state battery 1 according to an exemplary embodiment will be described. First, an adhesive layer coating solution that includes a first binder, a second binder, an adhesive layer conductive material, and a first solvent for dissolving the first binder and the second binder is prepared. Herein, examples of the first solvent may be amide solvents such as N-methylpyrrolidone ("NMP"), N,N-dimethylformamide (DMF), and N,N-dimethylacetamide, alkyl ester solvents such as butyl acetate and ethyl acetate, ketone solvents such as acetone, methylethylketone, and methylisobutylketone, ether solvents such as tetrahydrofuran and diethyl ether, and alcohol solvents such as methanol, ethanol, and isopropyl alcohol. As will be described below, since the adhesive layer 3 does not include a sulfide-based solid-state electrolyte or includes only a small amount of the sulfide-based solid-state electrolyte swollen from the cathode layer 4, a polar solvent can be used as the first solvent.

Next, the adhesive layer 3 is formed by coating the cathode current collector 2 with the adhesive layer coating solution and drying the coated cathode current collector 2. Also, an adhesive film is formed by coating a substrate with the adhesive coating solution by using a desktop screen printer and drying the coated substrate. Then, the adhesive film may be pressed to the cathode current collector 2.

Thereafter, a cathode layer coating solution that includes a sulfide-based solid-state electrolyte, a cathode active material, a cathode layer conductive material, and a second solvent for dissolving a cathode layer binder is prepared. The second solvent dissolves the cathode layer binder (first binder), but does not dissolve the second binder. Specifically, the second solvent is a non-polar solvent and for example, may include aromatic hydrocarbons, such as xylene, toluene, and ethylbenzene, and aliphatic hydrocarbons, such as pentane, hexane, and heptane. Next, the cathode layer 4 is formed by coating the adhesive layer 3 with the cathode layer coating solution and drying the coated adhesive layer 3. Accordingly, since the first binder in the adhesive layer 3 swells in the cathode layer 4 due to the dissolution of the first binder in the second solvent, the bonding between the adhesive layer 3 and the cathode layer 4 may become stronger. In the exemplary embodiment, since the cathode 10 is formed by coating, the large-area cathode 10 may be easily prepared. That is, in the present embodiment, the solid-state battery 1 having high capacity may be easily prepared.

Also, since the second solvent does not dissolve the second binder, the swelling of the second binder of the adhesive layer 3 into the cathode layer 4 may be prevented when the adhesive layer 3 is coated with the cathode layer coating solution. Thus, the degradation of the sulfide-based solid-state electrolyte in the cathode layer 4 by the second solvent may be prevented. A cathode structure including the cathode current collector 2, the adhesive layer 3, and the cathode layer 4 is formed by the above processes.

An anode layer coating solution including a first binder, an anode active material, a sulfide-based solid-state electrolyte, and a second solvent is prepared. In a case where the sulfide-based solid-state electrolyte is not included in the anode layer 6, the first solvent (polar solvent) may be used. Next, the anode layer 6 is formed by coating the anode current collector 7 with the anode layer coating solution and drying the coated anode current collector 7. Therefore, the anode structure is formed.

Next, an electrolyte coating solution including a sulfide-based solid-state electrolyte, an electrolyte binder, and a second solvent is prepared. Thereafter, the electrolyte layer 5 is formed by coating a substrate, such as a glass plate, with the electrolyte layer coating solution and drying the coated substrate. Then, the electrolyte layer 5 is pressed on the anode layer 6 of the anode structure.

Next, the solid-state battery 1 is formed by pressure bonding sheets that are formed from the cathode structure, the electrolyte layer 5, and the anode structure.

The present invention will be described in more detail, according to the following examples and comparative examples. However, the following examples are merely presented to exemplify the present invention, and the scope is not limited thereto.

EXAMPLES

Next, examples of the present embodiment will be described. In addition, processes for each example and comparative example were all performed in a dry room at a dew point of about 55° C. or less.

Example 1

Adhesive Layer Formation

Graphite (KS-4, Timcal, hereinafter the same), acetylene black (DENKA, hereinafter the same) as an adhesive layer conductive material, a styrene-based thermoplastic elastomer (hereinafter, referred to as "binder A") (S.O.E1611, Asai Kasei Corporation, hereinafter the same) as a first binder, and acid modified polyvinylidene fluoride (PVDF) (hereinafter, referred to as "binder B") (KF9200, Kureha Corporation, hereinafter the same) as a second binder were weighed at a weight percent ratio of about 60:10:15:15. Then, the above materials and an appropriate amount of NMP were introduced into a planetary mixer and mixed at about 3,000 rpm for about 5 minutes to prepare an adhesive layer coating solution.

Next, an about 20 μm thick aluminum foil current collector, as the cathode current collector 2, was disposed on a desktop screen printer (Newlong Seimitsu Kogyo Co., Ltd., hereinafter the same), and the aluminum foil current collector was coated with the adhesive layer coating solution using an about 400 mesh screen. Subsequently, the cathode current collector 2 coated with the adhesive layer coating solution was vacuum dried at about 80° C. for about 12 hours. Thus, the adhesive layer 3 was formed on the cathode current collector 2. A thickness of the adhesive layer 3 after the drying was about 7 μm.

Cathode Layer Formation $LiNiCoAlO_2$ ternary powder as a cathode active material, $Li_2S$—$P_2S_5$ (about 80 mol %: about 20 mol %) as a sulfide-based solid-state electrolyte, and vapor-grown carbon fiber powder as a cathode layer conductive material (conductive auxiliary) were weighted at a weight percent ratio of about 60:35:5 and the above powders were mixed using a planetary mixer.

The sulfide-based solid-state electrolyte was formed by mixing an amorphous material and a crystalline material at a ratio (wt %) of about 80:20. The amorphous material was formed by mechanical milling (MM) $Li_2S$—$P_2S_5$ (about 80 mol %: about 20 mol %) at about 200 rpm for about 30 minutes, and the crystalline material was formed by sintering the amorphous material at about 205° C. in nitrogen for about 1 hour.

Subsequently, a primary mixed solution was prepared by adding a xylene solution, in which binder A as a cathode layer binder was dissolved, to the mixed powder in an amount of about 1.0 wt % based on a total weight of binder A and the mixed powder. Also, a secondary mixed solution was prepared by adding an appropriate amount of dehydrated xylene for viscosity adjustment to the primary mixed solution. Also, in order to improve the dispersion of the mixed powders, zirconia balls having a diameter of about 5 mm were introduced into the secondary mixed solution so that each of empty space, the mixed powders, and the zirconia balls occupied one-third of a total volume of mixing container. A tertiary mixed solution thus prepared was introduced into the planetary mixer and mixed at about 3,000 rpm for about 3 minutes to prepare a cathode layer coating solution.

Next, a sheet composed of the cathode current collector 2 and the adhesive layer 3 was disposed on a desktop screen printer, and the sheet was coated with the cathode layer coating solution using an about 150 μm thick metal mask. Thereafter, the sheet coated with the cathode layer coating solution was dried on a hot plate at about 40° C. for about 10 minutes, and then vacuum dried at about 40° C. for about 12 hours. Thus, the cathode layer 4 was formed on the adhesive layer 3. A total thickness of the cathode current collector 2, the adhesive layer 3 and the cathode layer 4 after the drying was about 165 μm.

Subsequently, a cathode structure was formed by rolling the sheet formed of the cathode current collector 2, the adhesive layer 3 and the cathode layer 4 using a roll press having a roll gap of about 10 μm. A thickness of the cathode structure was about 120 μm.

Anode Layer Formation

Graphite powder (vacuum dried at about 80° C. for about 24 hours) as an anode active material, binder A as a first binder, and $Li_2S$—$P_2S_5$ (about 70 mol %: about 30 mol %) as a sulfide-based solid-state electrolyte were weighed at a weight percent ratio of about 69.0:1.0:30.0. The above materials and an appropriate amount of xylene were introduced into a planetary mixer and mixed at about 3,000 rpm for about 3 minutes. Then, an anode layer coating solution was prepared by performing a degassing treatment for about 1 minute. A ratio of the amorphous material and the crystalline material of the sulfide-based solid-state electrolyte was the same as that of the cathode.

Next, an about 16 μm thick copper foil current collector was prepared as the anode current collector 7, and the copper foil current collector was coated with the anode layer coating solution using a blade. A thickness (gap) of the anode layer coating solution on the copper foil current collector was about 150 μm.

The sheet coated with the anode layer coating solution was put in a dryer heated at about 80° C. and dried for about 20 minutes. Thereafter, an anode structure was formed by rolling the sheet formed of the anode current collector 7 and the anode layer 6 using a roll press having a roll gap of about 10 μm. A thickness of the anode structure was about 100 μm.

Electrolyte Layer Formation

A primary mixed solution was prepared by adding a xylene solution of binder A (electrolyte binder) to $Li_2S$—$P_2S_5$ (about 70 mol %: about 30 mol %) as a sulfide-based solid-state electrolyte so that an amount of binder A is about 1 wt % based on a weight of the amorphous powder. A secondary mixed solution was prepared by adding an appropriate amount of dehydrated xylene favorable to viscosity adjustment to the primary mixed solution. Also, in order to improve the dispersion of the mixed powders, zirconia balls having a diameter of about 5 mm were introduced into the secondary mixed solution so that each of empty space, the mixed powders, and the zirconia balls occupied one-third of a total volume of mixing container. A tertiary mixed solution thus prepared was introduced into the planetary mixer and mixed at about 3,000 rpm for about 3 minutes to prepare an electrolyte layer coating solution. A ratio of the amorphous material and the crystalline material in the sulfide-based solid-state electrolyte of the solid-state electrolyte layer was made to be about 20:80.

Next, a glass plate was disposed on a desktop screen printer, and the glass plate was coated with the electrolyte layer coating solution using an about 200 μm thick metal mask. Thereafter, the glass plate coated with the electrolyte layer coating solution was dried on a hot plate at about 40° C. for about 10 minutes, and then vacuum dried at about 40° C. for about 12 hours. Thus, the electrolyte layer 5 was obtained. A thickness of the dried electrolyte layer 5 was about 130 μm. Next, the electrolyte layer 5 was formed on the anode structure by binding the electrolyte layer 5 and the anode layer 6 of the anode structure by a dry lamination method using a roll press having a roll gap of about 30 μm.

Solid-State Battery Formation

A sheet formed of the anode structure and the electrolyte layer 5, and the cathode structure were respectively cut with a Thomson blade. Then, a single cell (unit cell) of the solid-state battery 1 was formed by binding the electrolyte layer 5 of the sheet and the cathode layer 4 of the cathode structure together by a dry lamination method using a roll press having a roll gap of about 50 μm.

Example 2 and Comparative Examples 1 to 12

Each solid-state battery (Example 2 and Comparative Examples 1 to 12) was prepared by changing a ratio of the amorphous material and the crystalline material of the sulfide-based solid-state electrolyte in each of a cathode, an electrolyte layer, and an anode according to values listed in Table 1 below.
Battery Characteristics Test
Discharge capacity (mAh) was measured on each single cell prepared as above by charging each single cell at a constant current density of about 0.05 mA/cm$^2$ and then discharging using a TOSCAT-3100 charging and discharging evaluation system by Toyo System Co., Ltd. (upper charge voltage limit: about 4.0 V, lower discharge voltage limit: about 2.5 V). Discharge capacities (mAh/g) of Examples and Comparative Examples at a lower discharge voltage limit of about 2.5 V are presented in Table 1 below.
Cycle Characteristics Test
Charge and discharge cycle tests were performed at a 0.05 C constant current rate at room temperature to evaluate capacity retention ratios with respect to discharge capacity in the 1$^{st}$ cycle. The results of Examples and Comparative Examples are presented in Table 1.

TABLE 1

|  | Crystalline/amorphous | | | Capacity | |
| --- | --- | --- | --- | --- | --- |
|  | Cathode | Solid-state electrolyte layer | Anode | Discharge capacity [mAh/g] | retention ratio after 50 cycles [%] |
| Example 1 | 20/80 | 80/20 | 20/80 | 124 | 77 |
| Example 2 | 20/80 | 80/20 | — | 120 | 75 |
| Comparative Example 1 | 100/0 | 60/40 | 20/80 | 53 | 53 |
| Comparative Example 2 | 80/20 | 60/40 | 20/80 | 67 | 67 |
| Comparative Example 3 | 60/40 | 60/40 | 20/80 | 52 | 52 |
| Comparative Example 4 | 0/100 | 60/40 | 20/80 | 81 | 81 |
| Comparative Example 5 | 20/80 | 0/100 | 20/80 | 94 | 81 |
| Comparative Example 6 | 20/80 | 20/80 | 20/80 | 91 | 78 |
| Comparative Example 7 | 20/80 | 100/0 | 20/80 | 98 | 75 |
| Comparative Example 8 | 20/80 | 60/40 | 80/20 | 111 | 55 |
| Comparative Example 9 | 20/80 | 60/40 | — | 102 | 49 |

As shown in Table 1, it was confirmed that the amorphous material is included in the solid-state electrolyte of the cathode and the anode, and also, when the proportion of the amorphous material in the solid-state electrolyte of the solid-state electrolyte layer was smaller than that of the amorphous material in the cathode and the anode, discharge capacity of the solid-state battery was high and cycle characteristics thereof were also good (Example 1).

In contrast, in a case where the proportion of the amorphous material in the cathode and/or the anode was high (Comparative Examples 1 to 3), it was confirmed that cycle lifetime decreased in comparison to Example 1. In Comparative Example 4, since the crystalline material was not included in the sulfide-based solid-state electrolyte of the cathode, discharge capacity decreased in comparison to Example 1. However, cycle lifetime was good. In Comparative Examples 5 and 6, since the proportion of the crystalline material in the solid-state electrolyte layer was low, discharge capacity was decreased in comparison to Example 1. Since the amorphous material was not included in the solid-state electrolyte layer in Comparative Example 7, discharge capacity was decreased in comparison to Example 1. Since an amount of the amorphous material is low in Comparative Example 8, cycle lifetime decreased in comparison to Example 1.

As described above, according to the one or more of the above embodiments, a solid-state battery having improved discharge capacity and cycle characteristics may be provided by setting a crystal structure of a solid-state electrolyte in a cathode, an anode, and an electrolyte layer to an appropriate range.

It should be understood that the exemplary embodiments described therein should be considered in a descriptive sense only and not for purposes of limitation. Descriptions of features, advantages, or aspects within each embodiment should typically be considered as available for other similar features, advantages, or aspects in other embodiments.

While one or more embodiments have been described with reference to the figures, it will be understood by those of ordinary skill in the art that various changes in form and details may be made therein without departing from the spirit and scope as defined by the following claims. For example, although it has been described in the exemplary embodiments that the solid-state electrolyte is included in the cathode and the anode, the effect may be achieved even if the solid-state electrolyte is not included in the anode.

What is claimed is:
1. A solid-state battery comprising:
   a cathode;
   an anode; and
   a solid-state electrolyte layer disposed between the cathode and the anode,
   wherein the solid-state electrolyte layer and at least the cathode of the cathode and the anode comprises a sulfide solid-state electrolyte,
   the sulfide solid-state electrolyte comprises an amorphous material and a crystalline material,
   a first proportion of the amorphous material in at least the cathode of the cathode and the anode is greater than a first proportion of the crystalline material in at least the cathode of the cathode and the anode such that the first proportion of the amorphous material is present in an amount of about 70 weight percent to about 90 weight percent based on a total content of the sulfide solid-state electrolyte in at least the cathode of the cathode and anode, and
   a second proportion of the amorphous material in the solid-state electrolyte layer is less than a second proportion of the crystalline material in the solid-state electrolyte layer such that the amorphous material is present in an amount of about 10 weight percent to about 30 weight percent based on a total content of the sulfide solid-state electrolyte in the solid-state electrolyte layer.
2. The solid-state battery of claim 1, wherein the first proportion of the amorphous material in at least the cathode of the cathode and the anode is greater than the second proportion of the amorphous material in the solid-state electrolyte layer.

3. The solid-state battery of claim 1,
wherein the first proportion of the amorphous material is greater than the second proportion of the amorphous material.

4. The solid-state battery of claim 1, wherein the sulfide solid-state electrolyte is a product of lithium sulfide and phosphorus sulfide.

5. The solid-state battery of claim 1, wherein the sulfide solid-state electrolyte comprises $Li_2S$—$P_2S_5$.

6. The solid-state battery of claim 1, wherein a first proportion of lithium sulfide in the cathode is greater than a second proportion of lithium sulfide in each of the anode and the solid-state electrolyte layer.

7. The solid-state battery of claim 6, wherein the first proportion of the lithium sulfide is greater than the second proportion the lithium sulfide, and wherein the first proportion of the lithium sulfide and the second proportion the lithium sulfide are each independently present in an amount of about 60 weight percent to about 85 weight percent, based on a total weight of the lithium sulfide and phosphorus sulfide.

8. The solid-state battery of claim 6, wherein the first proportion of the lithium sulfide is present in an amount of about 70 weight percent to about 85 weight percent, based on a total weight of the lithium sulfide and phosphorus sulfide.

9. The solid-state battery of claim 6, wherein the second proportion of lithium sulfide is present in an amount of about 60 weight percent to about 75 weight percent, based on a total weight of the lithium sulfide and phosphorus sulfide.

10. The solid-state battery of claim 1, wherein the cathode comprises a cathode current collector and a cathode layer.

11. The solid-state battery of claim 10, further comprising an adhesive layer between the cathode current collector and the cathode layer.

12. The solid-state battery of claim 10, wherein an amount of the sulfide solid-state electrolyte in the cathode layer is in a range of about 20 weight percent to about 50 weight percent, based on a total weight of the cathode layer.

13. The solid-state battery of claim 1, wherein the anode comprises an anode current collector and an anode layer.

14. The solid-state battery of claim 13, wherein an amount of the sulfide solid-state electrolyte in the anode layer is in a range of about 0 weight percent to about 40 weight percent, based on a total weight of the anode layer.

15. The solid-state battery of claim 1, wherein an amount of the sulfide solid-state electrolyte in the solid-state electrolyte layer is in a range of about 95 weight percent to about 99.9 weight percent, based on a total weight of the solid-state electrolyte layer.

16. The solid-state battery of claim 1, wherein the solid-state electrolyte layer has a lithium-ion conductivity which is greater than a lithium-ion conductivity of the cathode and greater than a lithium-ion conductivity of the anode.

\* \* \* \* \*